Patented Dec. 27, 1932

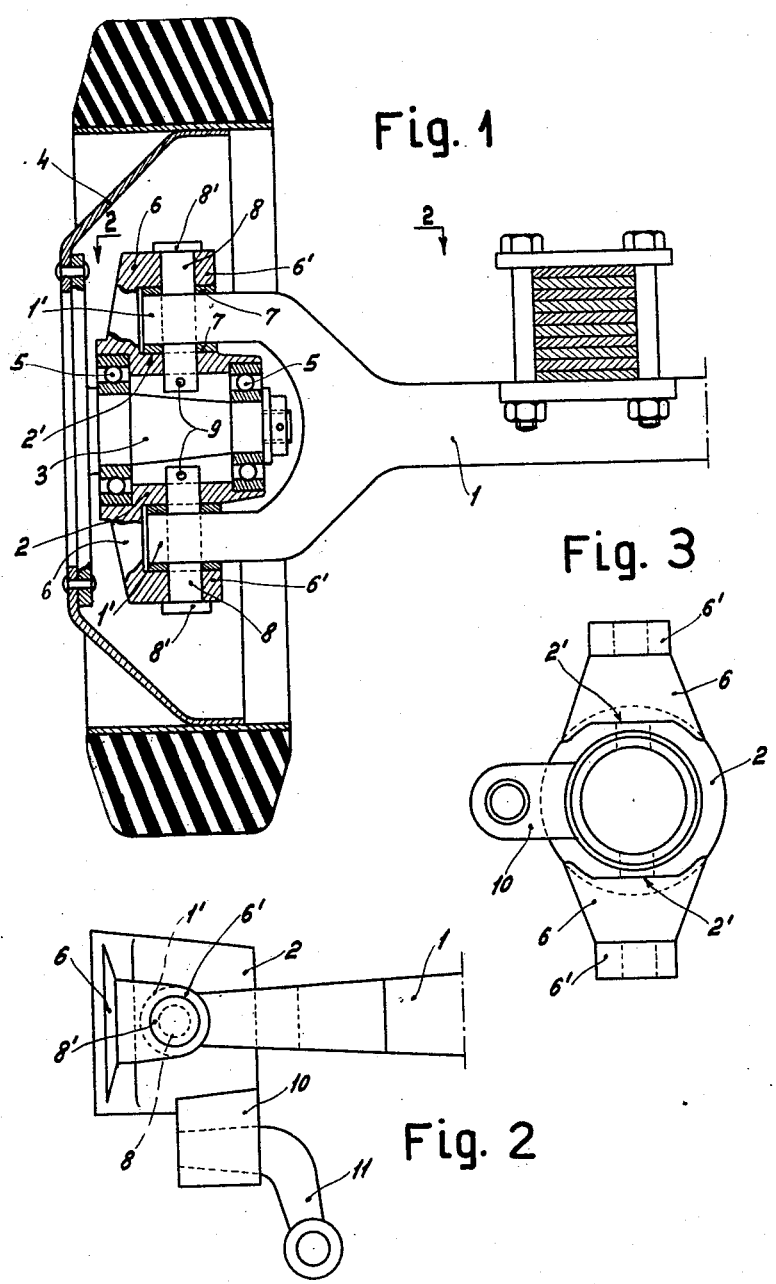

1,892,479

UNITED STATES PATENT OFFICE

ACHILLE ARATO, OF TURIN, ITALY

MOUNTING FOR STEERING WHEELS OF VEHICLES

Application filed November 13, 1930, Serial No. 495,466, and in Italy November 23, 1929.

In mounting of steering wheels on vehicles it is known to mount a steering wheel in a fork-shaped end of a vehicle axle by means of a box which comprises pivots journalled in said fork end of the axle and has the wheel supporting pivot mounted to rotate inside it.

In such known arrangements the pivots of the wheel-carrying box in the axle fork are in objectionable operative conditions because they are cantilever one, that is they have one end solid with said box and their other end entirely free, and therefore they are subject to a bending stress in their portion where they connect with said box; further the operations for mounting the wheel-carrying box in the axle fork are difficult and said mounting is complicated and defective.

The present invention has for its object an arrangement removing the drawbacks referred to and in which the wheel-carrying box and the axle end provide compenetrating hinge members and each pivot passes through such hinge members and therefore is under a simple shearing stress.

On the annexed drawing is illustrated by way of example an embodiment of the present invention and Figure 1 is a fragmentary central section of a wheel and of means for mounting the same on a vehicle axle;

Figure 2 is a plan view of the axle and fork and of the wheel-carrying box mounted therein as seen from line 2—2 of Figure 1;

Figure 3 is a front view of the separate wheel-carrying box as seen from left end of Figure 2.

In the described embodiment the axle 1 provides at each end a fork comprising arms 1', 1' and a box 2 is located intermediate said arms, said box 2 enclosing a pivot 3 which carries the wheel 4 and is journalled in said box by means of antifriction bearings 5—5.

Vertical arms 6 extend upwards and downwards from said box 2 and said arms provide side lugs 6' adapted to embrace or extend over fork arms 1'—1' of the axle 1.

Antifriction washers 7 are located intermediate lugs 6'—6' and arms 1'—1' and intermediate said arms 1'—1' and adjacent flattened faces 2' of box 2, and pivot pins 8 are located in and extend throughout registering bores of parts 6', 1', 2; said pivot pins 8 have heads 8' bearing on lugs 6' and their internal ends are locked within box 2 by means of fastening pins 9.

A socket 10 is provided on box 2 for fastening the steering arm 12 thereon.

By the described arrangement a very simple and strong mounting of steering wheels is secured.

What I claim as my invention and desire to secure by United States Letters Patent is:—

1. A mounting for steering wheels on a vehicle axle having fork arms at each end, comprising a box entering the space intermediate said arms, a wheel-carrying pivot journalled near its two ends in said box, two opposed parts radially projecting from the external edge of said box, a lug at the end of each part forming with the adjacent wall of said box a seat for one of said fork arms, and alined pivot pins each extending through corresponding holes in one of said fork arms and in the adjacent lug and wall of said box providing a seat therefor.

2. A mounting for steering wheels on a vehicle axle having fork arms at each end, comprising a box entering the space intermediate said arms, bearings arranged at the ends of said box, a wheel-carrying pivot journalled in said bearings, two opposed parts radially projecting from the external edge of said box, a lug at the end of each part forming with the adjacent wall of said box a seat for one of said fork arms, and alined pivot pins each extending through corresponding holes in one of said fork arms and in the adjacent lug and wall of said box providing a seat therefor, said holes being provided in the middle portion of said box wall between said bearings therein.

3. A mounting for steering wheels on a vehicle axle having fork arms at each end, comprising a box contained substantially within the space intermediate said arms, a wheel-carrying pivot journalled in said box, two opposed parts projecting radially and inwardly on the box from the external edge of said box, a lug at the end of each part forming with the adjacent wall of said box a seat for one of said fork arms, and alined pivot pins each extending through corresponding holes in one of said fork arms and in the adjacent lug and wall of said box providing a seat therefor.

4. A mounting for steering wheels on a vehicle axle having fork arms at each end, comprising a box contained substantially within the space intermediate said arms, bearings arranged at the ends of said box, a wheel-carrying pivot journalled in said bearings, two opposed parts projecting radially and inwardly on the box from the external edge of said box, a lug at the end of each part forming with the adjacent wall of said box a seat for one of said fork arms, and alined pivot pins each extending through corresponding holes in one of said fork arms and in the adjacent lug and wall of said box providing a seat therefor, said holes being provided in the middle portion of said box wall between said bearings therein.

In testimony whereof I have signed my name to this specification.

ACHILLE ARATO.